(12) United States Patent
Pöppel et al.

(10) Patent No.: US 10,645,508 B2
(45) Date of Patent: May 5, 2020

(54) ELECTRODYNAMIC TRANSDUCER AND METHOD FOR MANUFACTURING AN ELECTRODYNAMIC TRANSDUCER

(71) Applicant: Sennheiser electronic GmbH & Co. KG, Wedemark (DE)

(72) Inventors: Günter Pöppel, Stadthagen (DE); Robert Konetzky, Seelze (DE); André Michaelis, Wedemark (DE); Meike Faulhaber, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 15 days.

(21) Appl. No.: 15/695,124

(22) Filed: Sep. 5, 2017

(65) Prior Publication Data
US 2018/0070188 A1 Mar. 8, 2018

(30) Foreign Application Priority Data
Sep. 7, 2016 (DE) .................... 10 2016 116 706

(51) Int. Cl.
| | |
|---|---|
| H04R 31/00 | (2006.01) |
| B29C 45/14 | (2006.01) |
| B29C 65/48 | (2006.01) |
| H04R 9/02 | (2006.01) |
| H04R 7/12 | (2006.01) |
| H04R 7/18 | (2006.01) |
| H04R 9/06 | (2006.01) |

(52) U.S. Cl.
CPC ..... *H04R 31/003* (2013.01); *B29C 45/14467* (2013.01); *B29C 65/48* (2013.01);
(Continued)

(58) Field of Classification Search
CPC .......... H04R 9/06; H04R 9/049; H04R 9/041; H04R 31/006; H04R 31/00;
(Continued)

(56) References Cited

U.S. PATENT DOCUMENTS

| | | | | |
|---|---|---|---|---|
| 4,029,911 A | * | 6/1977 | Albinger ................. | B29C 65/08 29/594 |
| 4,158,756 A | * | 6/1979 | Keezer ..................... | H04R 7/12 29/594 |

(Continued)

*Primary Examiner* — Md S Elahee
*Assistant Examiner* — Angelica M McKinney
(74) *Attorney, Agent, or Firm* — Haug Partners LLP

(57) ABSTRACT

A method for manufacturing an electrodynamic transducer from a membrane system module and a magnet system module is disclosed. The membrane system module comprises an annular first chassis unit made by injection-molding and a diaphragm fixed thereon. A coil is fixed on a coil seat of the diaphragm. The magnet system module comprises a pole piece, a magnet and a yoke that each have a central hole, and a second chassis unit that is made by injection-molding and that fills the central holes in the pole piece, the magnet and the yoke. It surrounds the yoke at least partially, so that the pole piece, the magnet and the yoke are held. In the transducer, the membrane system module and the magnet system module are plugged together, wherein an annular recess on the lower side of the first chassis unit is arranged on a circumferential shoulder of the second chassis unit. This defines a position of the coil relative to the pole piece, to the magnet and to the yoke of the magnet system module.

17 Claims, 5 Drawing Sheets

(52) U.S. Cl.
CPC ........... *H04R 9/025* (2013.01); *H04R 31/006* (2013.01); *H04R 7/127* (2013.01); *H04R 7/18* (2013.01); *H04R 9/06* (2013.01); *H04R 2400/11* (2013.01)

(58) Field of Classification Search
CPC ........ H04R 2400/11; H04R 7/02; H04R 1/06; H04R 1/22; H04R 9/046; B29C 2045/14459; B29C 2045/2712; B29C 2045/0032; B29C 2045/0094; B29C 45/00; B29C 45/0053; B29C 45/561; B29C 45/0082; B29C 45/03; B29C 45/036; B29C 45/14467; B29C 49/06; B29C 45/14377; B29C 45/14385; B29C 45/14581; B29C 45/14614; B29C 45/14418; Y10T 29/49002; Y10T 29/4908; B29L 2031/3418
See application file for complete search history.

(56) References Cited

U.S. PATENT DOCUMENTS

| | | | | |
|---|---|---|---|---|
| 4,418,247 | A * | 11/1983 | Hansen | H04R 1/22 156/196 |
| 4,421,956 | A * | 12/1983 | O'Neill | H04R 9/025 381/414 |
| 4,520,237 | A * | 5/1985 | Murakami | H04R 1/06 381/412 |
| 5,111,510 | A * | 5/1992 | Mitobe | H04R 7/16 181/172 |
| 5,220,863 | A * | 6/1993 | Scott | B29C 33/005 156/245 |
| 5,524,151 | A * | 6/1996 | Bleim | H04R 9/06 381/345 |
| 5,875,253 | A * | 2/1999 | Okazaki | H04R 7/02 162/228 |
| 6,171,534 | B1 * | 1/2001 | Leach | B29C 45/14336 264/102 |
| 7,704,428 | B2 * | 4/2010 | Takayama | B29C 45/14065 264/255 |
| 7,876,923 | B2 * | 1/2011 | Finnegan | B29C 45/14336 29/594 |
| 2002/0071590 | A1 * | 6/2002 | Han | H04R 9/025 381/412 |
| 2005/0257998 | A1 * | 11/2005 | Sato | B29C 45/14344 181/167 |
| 2012/0161549 | A1 * | 6/2012 | Sell | B29C 45/14467 310/12.16 |
| 2016/0088395 | A1 * | 3/2016 | Popken | H04R 31/006 381/433 |

* cited by examiner

ELECTRODYNAMIC TRANSDUCER AND METHOD FOR MANUFACTURING AN ELECTRODYNAMIC TRANSDUCER

The present application claims priority from German Patent Application No. 10 2016 116 706.1 filed on Sep. 7, 2016.

FIELD OF THE INVENTION

It is noted that citation or identification of any document in this application is not an admission that such document is available as prior art to the present invention.

The present invention relates to an electrodynamic transducer and to a method for manufacturing an electrodynamic transducer.

BACKGROUND

FIG. 1 shows a schematic drawing of a conventional electrodynamic sound transducer. The transducer 100 comprises a diaphragm 110, a coil 120 and a magnet system 101 consisting of a pole piece 130, a magnet 140 and a yoke 150. The magnet system 101 together with the diaphragm 110 and the coil 120 can be placed and glued in a chassis 160. Further, the elements of the magnet system 101, namely pole piece 130, magnet 140 and yoke 150, can be glued together. Alternatively, the connection can be made by rivets. The coil 120 is a voice coil and coupled to the vibratory diaphragm 110.

The electrodynamic transducer described above is usually manufactured by first gluing together the pole piece 130, the magnet 140 and the yoke 150. This must be done very precisely, since a magnetic gap 170 for the coil 120 to vibrate is very narrow. Here it is to be considered that meeting the magnetic gap 170 exactly has a very big impact to the transducer's acoustic quality. The magnet system 101 consisting of the pole piece 130, the magnet 140 and the yoke 150 is glued into the chassis 160. Then the coil 120 that is fixed to the vibratory diaphragm 110 can be inserted into the magnetic gap, and the diaphragm can be glued at its edge for example to the chassis 160.

Both when assembling the magnet system 101, consisting of the pole piece 130, the magnet 140 and the yoke 150, and when inserting the magnet system into the chassis, extreme precision of execution is important. It is of high importance that the assembly is performed concentrically (i.e. that all—usually rotationally symmetrical—components are assembled with a common center), and that the resulting magnetic gap 170 has constant width at every point of the circumference and the coil is centric therein. Even smallest deviations that may occur during assembly will lead to hearable distortion in acoustic reproduction, e.g. due to staggering of the diaphragm when being driven.

Especially for gluing the edge of the diaphragm to the chassis it must be ensured that the coil is centered in the magnetic gap.

The manufacturing of an electrodynamic transducer as describe above is unfavorable, since all method steps need to be executed in an extremely accurate way, and since an exactly accurate arrangement of the single components is required. Nevertheless, a certain amount of scrap during manufacturing cannot be avoided.

Joining the magnet system by rivets can lead to mechanical abrasion of the material or the riveter, which may pollute the tools used. This attrition material may also accumulate during assembly at places in the product where it may lead to malfunction.

When the elements of the magnet system are glued together, surplus glue may pollute the centering tool. This leads to a high amount of scrap and a high maintenance effort. When the magnet system is inserted into the chassis, the yoke must fit exactly into the chassis. Therefore low tolerances of the outer diameter of the yoke and the inner diameter of a recess in the chassis are required. Thus, manufacturing of the chassis may be very cost-intensive. Moreover, adhesion between the yoke and the inner side of the chassis must be good for the yoke not to slip.

In the German patent application which is the priority application for the present application, the German Patent and Trademark Office has cited the following documents: DE 10 2011 080 606 A1, DE 102014 114 713A1 and U.S. Pat. No. 6,236,733 B1.

U.S. Pat. No. 7,433,478 B2 describes an electroacoustic transducer and a method for its manufacturing.

DE 2901223 describes a method for manufacturing a magnet system for electrodynamic transducers. Herein, components of the magnet system can be fixed in their position by thermoplastic material.

DE 1974072 U describes a coil connection for a dynamic electroacoustic transducer. The electrodynamic transducer has a plastic yoke that encloses fully or partially a magnet system of the transducer.

SUMMARY OF THE INVENTION

It is an object of the present invention to provide an electroacoustic transducer and in particular an electrodynamic transducer that can be manufactured easier and more effectively. Further, a corresponding method should be provided.

This object is solved by an electrodynamic transducer according to claim 10 having a membrane system module according to claim 6 and a magnet system module according to claim 8, and by a method for manufacturing an electrodynamic transducer according to claim 1.

Thus, a method for manufacturing an electrodynamic transducer from at least two modules is provided, which can be assembled simply and robustly to obtain the electrodynamic transducer. The method comprises making an annular first chassis unit by injection-molding a first annular cavity of a first injection-molding tool with plastic, placing a coil and the first chassis unit on a mandrel such that the coil is surrounded by the first chassis unit, and placing and gluing a vibratory diaphragm on the first chassis unit and on the coil, wherein the first module of the electrodynamic transducer is obtained. It is also referred to as membrane system module.

The method further comprises manufacturing an annular second chassis unit by placing a pole piece, a magnet and a yoke in a first portion of a second injection-molding tool that has a first annular recess and a second central recess, wherein the pole piece, the magnet and the yoke each have a central hole. The method further comprises placing a second portion of the second injection-molding tool on the first portion of the second injection-molding tool, the second portion comprising a central recess that is larger than the first and second recess of the first portion. Then, the cavity defined by the recesses of the first and second portions of the second injection-molding tool is injection-molded with plastic, so that after hardening of the injected plastic a second chassis unit is obtained. The plastic of the second chassis unit fills the holes in the pole piece, the magnet and the yoke, so that the pole piece, the magnet and the yoke are held together by the injected part of the second chassis unit, and a second module of the electrodynamic transducer is obtained. It is also referred to as magnet system module.

The method further comprises assembling the first module with the second module to obtain the electrodynamic transducer.

According to an aspect of the present invention, a contact strip is inserted between the first and second portion of the first injection-molding tool before the plastic is injections molded.

According to a further aspect of the present invention, the first chassis unit has on its lower side an annular recess that may define a position of the first chassis unit when placing it on the mandrel, so as to center the coil in the first chassis unit. However, the annular recess of the first chassis unit has also the following additional advantage.

According to a further aspect of the present invention, the second chassis unit has an upwards directed circumferential shoulder, on which the annular recess of the first chassis unit is placed when assembling the first module with the second module. This results automatically not only in a centering, but also in a correct position of the first and second chassis units relative to each other, and thus in a correct height positioning of the coil within the magnetic gap.

According to a further aspect of the present invention, the second chassis unit has a dome (i.e. a mushroom-shaped ridge) above the pole piece.

The invention also relates to a membrane system module for an electrodynamic transducer, which has an annular first chassis unit made by injection-molding and a diaphragm that is glued on the first chassis unit. The diaphragm has a coil seat on which a coil is fixed. Further, the first chassis unit has on its lower side an annular recess. In an embodiment, the membrane system module comprises at least one molded contact strip.

The invention also relates to a magnet system module for an electrodynamic transducer, which has a pole piece, a magnet and a yoke, wherein the pole piece, the magnet and the yoke each have at least one substantially central hole. The magnet system module has a second chassis unit that is made by injection-molding and that fills the holes in the pole piece, the magnet and the yoke, such that the pole piece, the magnet and the yoke are held in the second chassis unit by the molded plastic. The second chassis unit surrounds the yoke completely, or at least partially. Further, the second chassis unit has a circumferential shoulder that is upwardly directed, i.e. towards the membrane system module to be assembled. Usually, it is advantageous for the assembly and stability if this shoulder is outside the yoke.

The two modules can be produced independent of each other and then joined together. With the method according to the invention, the requirements on tolerances are substantially smaller, typically cut by half at comparable expense, due to the special assembly procedure. This leads to massive savings with constant quality requirements, or correspondingly higher accuracy (better quality) at comparable expense, respectively. Consequently, the membrane system module according to the invention and the magnet system module according to the invention can be manufactured with very low tolerances, and thus may be joined together very simply and well-fitting. Thus, the scrap rate is reduced.

The transducer according to the invention is also advantageous because higher tolerances for single elements are acceptable. Further, complex geometries may be realized, e.g. there may be a mushroom-shaped dome below the calotte of the diaphragm. This is advantageous in particular with respect to the acoustic quality of the electrodynamic transducer, since it reduces the capacity below the diaphragm. Neither the calotte nor the dome need to be exactly spherical segments.

Advantages and embodiments of the invention will be described below with reference to the drawings.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements may be desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
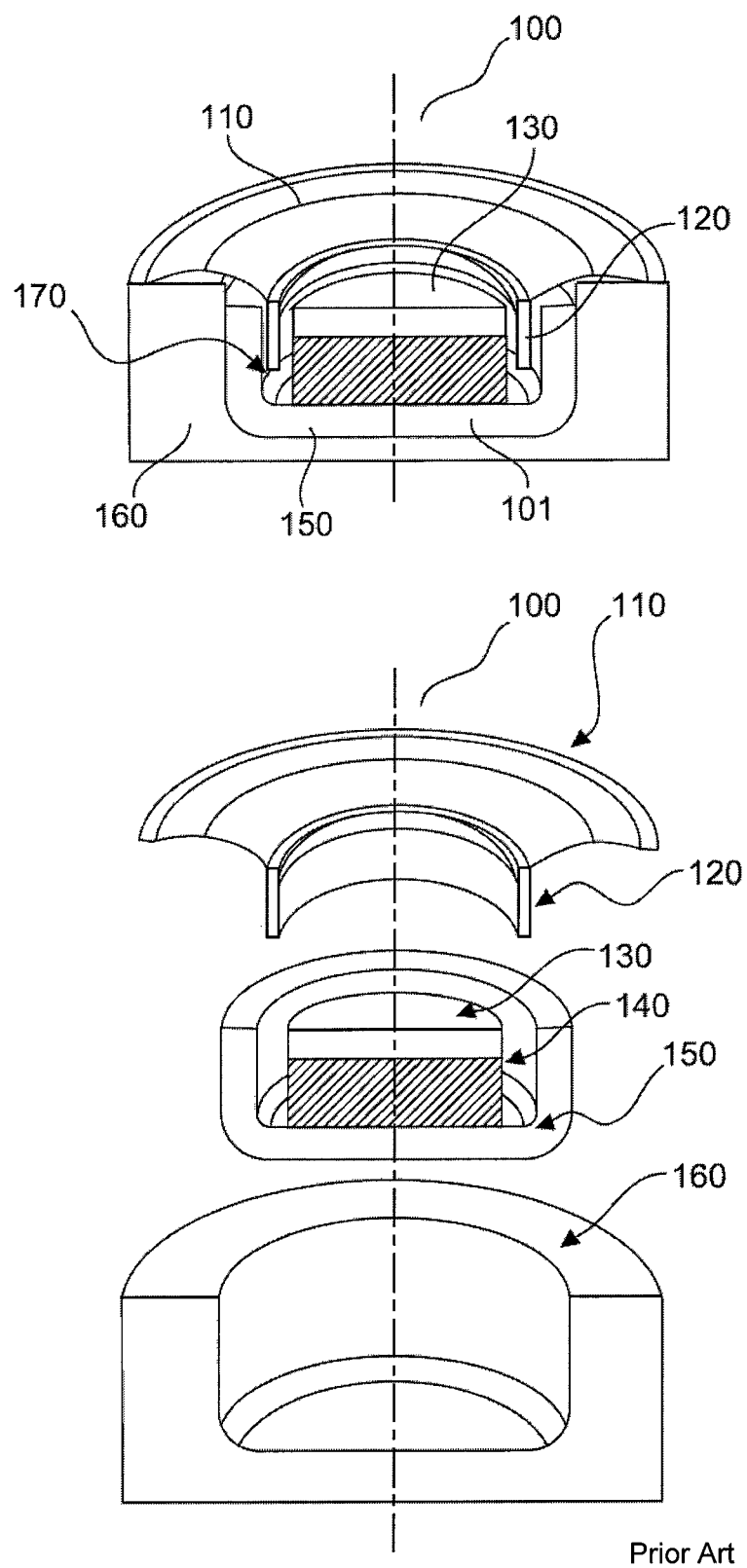
FIG. 1 shows a schematic view of a conventional electrodynamic transducer.
Figure 2:
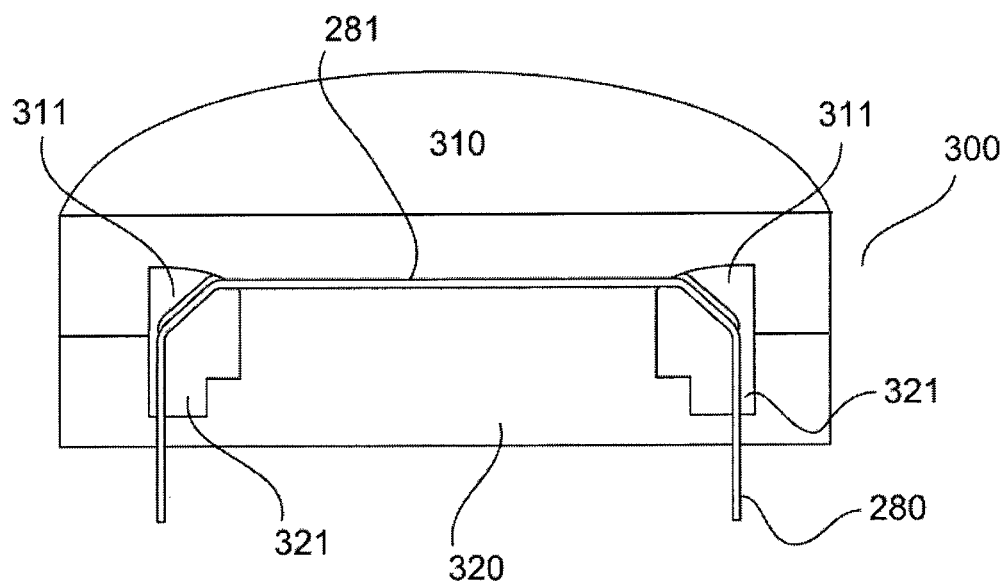
FIG. 2 shows a schematic view of the first injection-molding tool for manufacturing the first chassis unit for the first module (membrane system module) of an electrodynamic transducer according to the invention.

FIG. 2 shows a schematic view of an injection-molding tool for manufacturing a chassis unit for a membrane system module of an electrodynamic transducer according to a first embodiment.

A first injection-molding tool 300 comprising a first, upper portion 310 and a second, lower portion 320 is provided. There is an annular recess 311 in the upper portion 310 and an annular recess 321 in the lower portion 320. The lower and the upper portions are put on each other, wherein an angled, substantially U-shaped metallic contact strip 280 (e.g. from a slim metal sheet) is put at least partially between them. The annular recesses 311,321 together form a cavity into which liquefied plastic is injected in order to form a first chassis unit 260 of the membrane system module. After the injected plastic has become hard, the first and second portions of the first injection-molding tool are removed, so that the first annular chassis unit with the contact strip remains. A middle portion 281 of the contact strip 280, which extends over the opening of the annular first chassis unit, serves only for easier manufacturing (only one piece of metal instead of two connection sheets) and is later removed.

Figure 3:
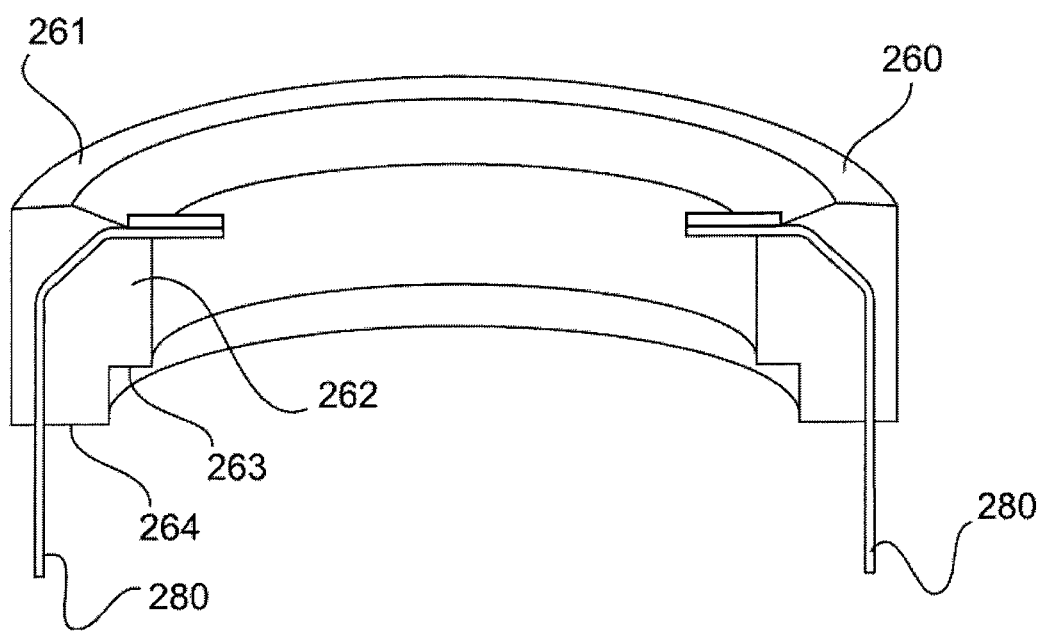
FIG. 3 shows the first chassis unit for the first module.

FIG. 3 shows the first chassis unit 260 of the membrane system module with the embedded U-shaped contact strip 280, wherein the middle portion 281 of the contact strip 280 has already been removed. On each side remains a short connection portion 282 of the contact strip for connecting the coil. The first chassis unit 260 is annular. The shape of the chassis is determined by the annular recesses 311,321 in the first injection-molding tool. The first chassis unit 260 has an upper side 261 (on which later the diaphragm will be placed), a middle portion 262, a recess 263 and a lower side 264, wherein the lower side is the one that after placing the diaphragm is turned away thereof.

Then, a coil (or voice coil) and the first chassis unit are placed on a mandrel such that the coil is surrounded by the first chassis unit, and the connectors of the coil are each connected electrically with a connection portion 282 of the contact strip. A vibratory diaphragm is placed on the first chassis unit and the coil. The diaphragm is glued on its edge to the first chassis unit (e.g. on the upper edge portion) and to the coil, so that a first module of the electrodynamic transducer is obtained.

Figure 4:
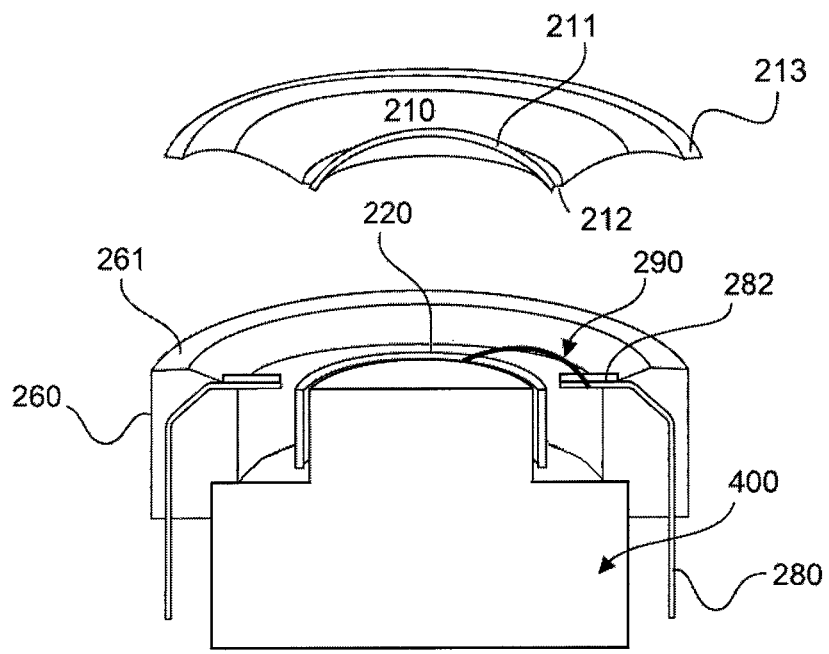
FIG. 4 shows the assembly of the first chassis unit, the coil and the diaphragm to obtain the first module.

FIG. 4 shows a mandrel 400 receiving the coil 220 and how the coil 220 is electrically connected to the end portion 282 of the contact strip 280 by a wire 290. Then, the diaphragm 210 is put in place. Thereby, the connection portions 282 and thus the contacts can be arranged below the diaphragm, and the contacting process during manufacturing is simplified. Further, the diaphragm may thereby protect the connection. The diaphragm has a calotte 211, a coil seat 212 and an edge 213. The diaphragm 210 is glued at its edge 213 to the upper side 261 of the first chassis unit 260. Further, the diaphragm 210 at its coil seat 212 is glued to the coil 220. Then, the mandrel can be removed, so that a stable chassis unit (with the diaphragm and the coil) remains. This chassis unit has the advantage that the position of the coil, and in particular its position relative to the recess 263 on the lower side of the first chassis unit, is very accurate. Using the recess 263, the first chassis unit can be centered on the mandrel 400 for assembling the coil and the diaphragm. Moreover, the first and second modules can be joined very easily and accurately.

Figure 5:
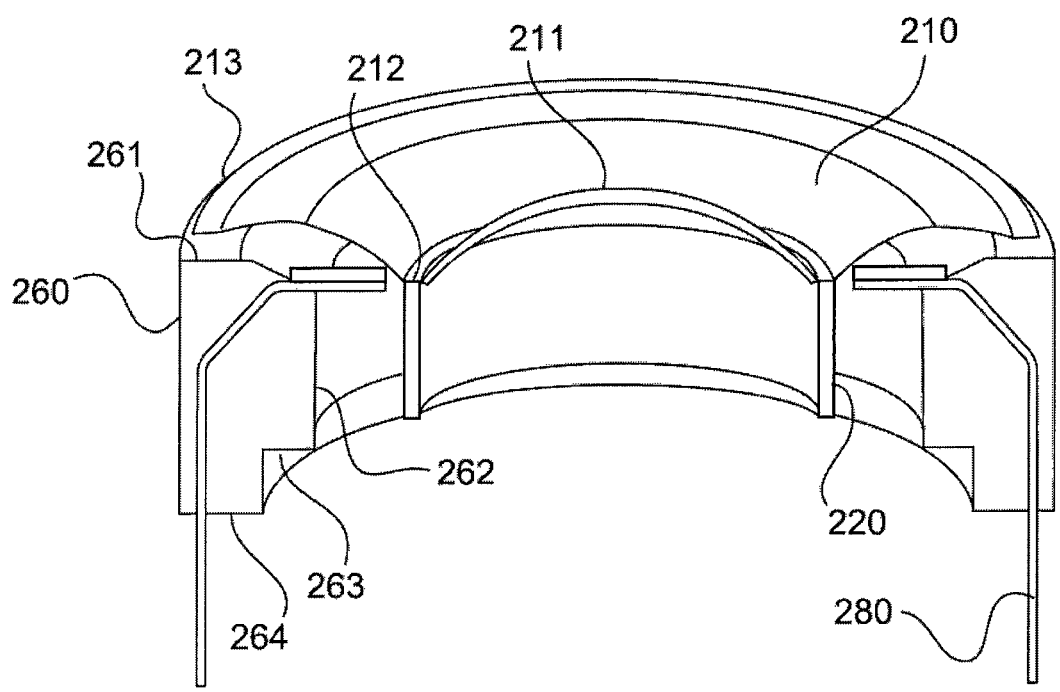
FIG. 5 shows a schematic sectional view of the first module (membrane system module).

In FIG. 5, the first module (membrane system module) with the first chassis unit, diaphragm 210, coil 220 and contacts 280 is depicted. These components are held or supported by the first chassis unit 260.

For manufacturing the second module (magnet system module) of the electrodynamic transducer, two portions of a second injection-molding tool that both have recesses are put together, wherein the recesses form a cavity and wherein the magnet system comprising the yoke, the magnet and the pole piece is fixed within this cavity, e.g. in the upper portion of the tool. The yoke, the magnet and the pole piece have at least one opening, e.g. in the center. Afterwards, the remaining cavity is filled in an injection-molding process with liquefied plastic that after hardening in principle forms the second chassis unit. Thereby, a molded magnet system with the pole piece, the magnet and the yoke is manufactured as the second module. This process has in particular the ads vantage that the positioning of the magnet system may be very accurate. This refers both to the position of the single elements of the magnet system relative to each other and the position of the complete magnet system relative to the second chassis unit, in particular to the circumferential shoulder of the second chassis unit.

Figure 6:
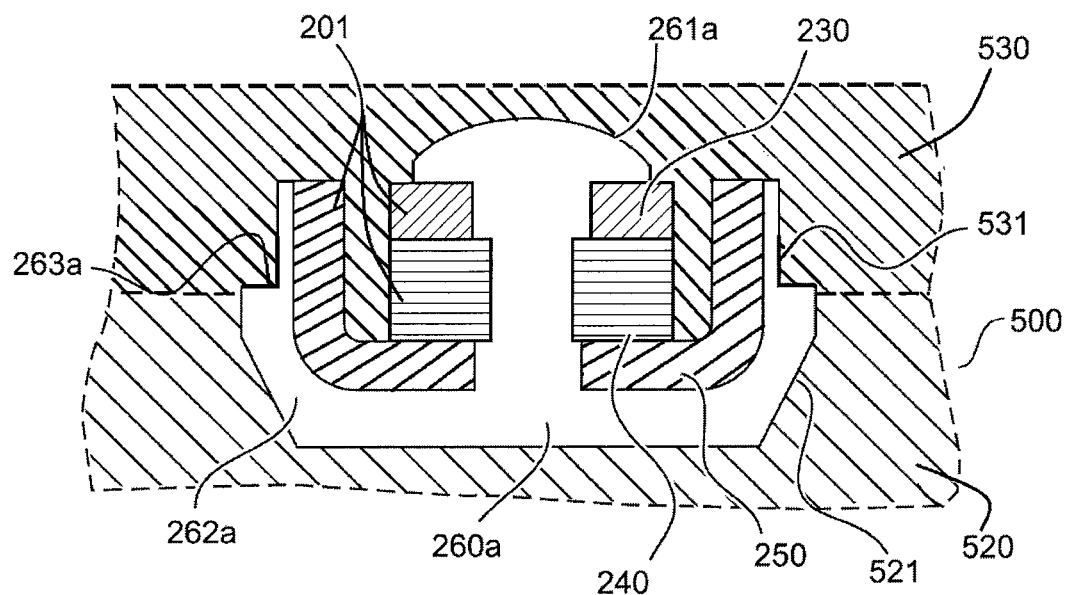
FIG. 6 shows a schematic view of the second injection-molding tool for manufacturing the second module (magnet system module) of an electrodynamic transducer according to the invention.

In FIG. 6, the second injection-molding tool 500 for manufacturing the second module (magnet system module) is schematically depicted. The second injection-molding tool 500 has a lower portion 520 and an upper portion 530. In the lower portion 520 is provided a first annular recess 521, and in the upper portion is provided a second annular recess 531. The magnet system 201 comprising the pole piece 230, the magnet 240 and the yoke 250 is put into a first portion, e.g. the upper portion 530, of the second injection-molding tool. A second portion of the second injection-molding tool is placed on the first portion, and the cavity that is left free by the recesses in the first and second portion of the second injection-molding tool is filled with a liquefied material such as plastic, so that after hardening of the injected plastic a second chassis unit 260a is obtained. The pole piece 230, the magnet 240 and the yoke 250 of the magnet system have at least one hole each into which the plastic for the second chassis unit may be injected. Thus, the second chassis unit fills the holes in the pole piece, the magnet and the yoke such that it holds the pole piece, the magnet and the yoke in a defined position to thereby obtain the second module. The holes in the pole piece, the magnet and the yoke may each be in a central position. According to the embodiment shown in FIG. 6, the second chassis unit 260a has a dome 261a, a lower portion 262a and a circumferential shoulder 263a. The circumferential shoulder 263a is directed upwards, i.e. in the same direction as e.g. the dome 261a.

According to an aspect of the present invention, the first module and the second module are joined to obtain an electrodynamic transducer. In an embodiment, at least one of the modules is rotationally symmetric, so that no rotational alignment needs to be considered for the joining. The membrane system module may e.g. be plugged to the magnet system module. The joining may be fixed by interference fit, glue, welding or similar.

Figure 7:
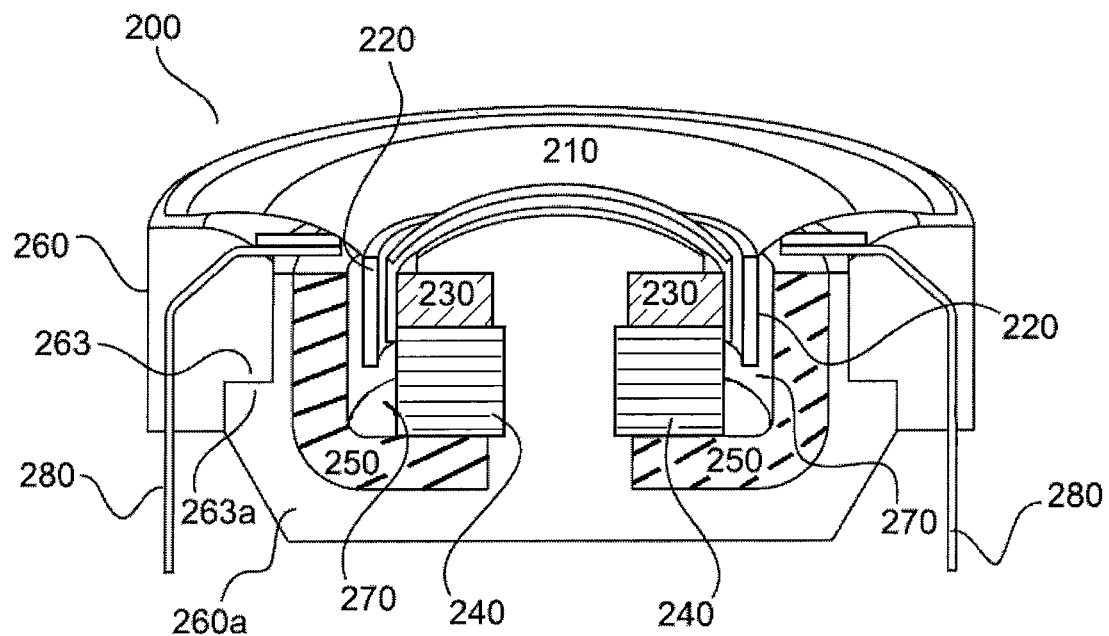
FIG. 7 shows a schematic sectional view of an electrodynamic transducer according to the invention.

FIG. 7 shows a schematic sectional view of the completely mounted electrodynamic sound transducer according to the invention. The transducer 200 consists of e.g. at least two modules, namely a membrane system module (first chassis unit 260 with contacts 280, coil 220 and diaphragm 210) and a magnet system module (second chassis unit 260a and magnet system 230-250). Both modules are manufactured by injection-molding using separate injection-molding tools, as described above. Optionally, further modules may be provided, e.g. for attaching the transducer.

According to an aspect of the invention, at least one hole can be provided in the magnet system 201, i.e. in the pole piece 230, the magnet 240 and the yoke 250, which is filled during the injection-molding process.

According to an aspect of the present invention, the pole piece 230, the magnet 240 and the yoke 250 are put into a second injection-molding tool, as described above. The injection-molding tool serves also for centering these components in order to accurately form the magnetic gap 270. Optionally, the second injection-molding tool may be used upside down. In this case the inserted components, i.e. the pole piece, the magnet and the yoke, remain automatically in the tool due to gravity. Subsequently, the liquefied plastic mass can be injected into the tool. Thereby the cavities formed by the recesses in the upper and lower parts of the second injection-molding tool are filled. When the plastic hardens, the single components of the magnet system are fixed, so that they are aligned accurately.

According to an aspect of the invention, a plastic embedded magnet system of an electrodynamic transducer is provided. The encapsulation of the components of the magnet system enables an exact centering or alignment of the components of the magnet system, so that an exactly defined narrow magnetic gap can be obtained. Moreover, the injection-molded parts can serve as chassis or as parts or portions of a chassis of the electrodynamic transducer. The two-part injection-molded chassis serves for joining the components of the magnet system and further as support for the diaphragm, i.e. the chassis provides a portion where an edge of the diaphragm can be fixed. In the electrodynamic transducer according to the invention, particularly in the chassis that is injection-molded from plastic, the yoke of the magnet system is embedded in plastic, so that gluing the yoke to the chassis is not necessary any more. Manufacturing the magnet system using injection-molding is advantageous also because additional gluing the components of the magnet system, namely pole plate, magnet and yoke, is not necessary any more.

According to an aspect of the present invention, further functions may be integrated in the chassis obtained by injection-molding. E.g. connections for the coil may be integrated already when making the chassis (see contact strip 280).

The first chassis unit 260 that is part of the membrane system module has on its lower side an annular recess 263. During assembly of the electrodynamic transducer, the first chassis unit 260 of the membrane system module (with the diaphragm 210 and the coil 220) is placed on the second chassis unit 260a of the magnet system module. Thereby, the shoulder 263a of the second chassis unit 260a of the magnet system module is in the recess 263 of the membrane system's first chassis unit 260.

Figure 8:
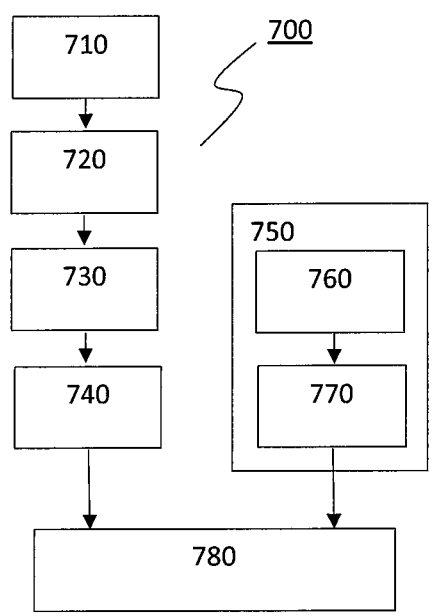
FIG. 8 shows a flow chart of a manufacturing method according to the invention.

FIG. 8 depicts a flowchart of a method 700 for manufacturing an electrodynamic transducer, according to an aspect of the present invention. The method comprises the steps making 710 an annular first chassis unit 260 by an injection-molding process using a first injection-molding tool 300, placing 720 the first chassis unit and a coil 220 on a mandrel 400 such that the coil is surrounded by the first chassis unit, connecting 730 the coil, and placing and gluing 740 a vibratory diaphragm 210 on the first chassis unit 260 and on the coil 220, wherein a first module of the electrodynamic transducer is obtained. Making 710 the annular first chassis unit 260 comprises injection-molding a first annular cavity of the first injection-molding tool 300 with plastic, wherein the first annular cavity results from placing a first portion 310 of the first injection-molding tool 300 having a first annular recess 311 on a second portion 320 of the first injection-molding tool 300 having a second annular recess 311,321. The first and second portions 310,320 of the first injection-molding tool are removed from the first chassis unit after the injected plastic is hard.

The method 700 further comprises making 750 an annular second chassis unit 260a by placing 760 a pole piece, a magnet and a yoke in a second injection-molding tool 500, wherein the pole piece, the magnet and the yoke each have a hole, and filling 770 the cavity defined by recesses in the second injection-molding tool 500 with plastic. Therein, also the holes in the pole piece, the magnet and the yoke are filled. After hardening of the injected plastic, the second module of the electrodynamic transducer with a second chassis unit 260a is obtained. The method 700 further comprises joining 780 the first module with the second module to obtain the electrodynamic transducer. Since the two modules can be manufactured independently from each other, the steps 710-740 may be performed before, after or simultaneously with the steps 750-770.

When producing 710 the annular first chassis unit 260 using injection-molding, a contact strip 280 may be put into the first injection-molding tool 300 before injecting the plastic. This simplifies connecting the first chassis unit with the coil.

Due to the high accuracy of the chassis units and the embedding of the connections in the chassis, acoustic tightness can be warranted. In particular, reproducibility during manufacturing is considerably improved, and thus the scrap rate is reduced.

According to the invention, centricity of the coil in the magnetic gap can be substantially improved. Another advantage of the invention is that the first chassis unit with the diaphragm and the coil can be separately tested. This may be done, in particular, before joining the first and second chassis units. The joining of the first and second chassis units can be achieved by reliable connection techniques, such as e.g. ultrasonic welding, laser-based plastic welding etc. Instead of the above-mentioned gluing, also other suitable joining techniques may be used.

The modules according to the invention as well as the electrodynamic transducers may be used for sound reproduction or sound recording, e.g. for headphones, earphones, loudspeakers and/or microphones.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for manufacturing an electrodynamic transducer comprising:

producing an annular first chassis unit by injection-molding a first annular cavity of a first injection-molding tool with plastic, wherein the first annular cavity results from placing a first portion of the first injection-molding tool on a second portion of the first injection-molding tool, the first portion of the first injection-molding tool having a first annular recess and the second portion of the first injection-molding tool having a second annular recess;

placing a coil on a mandrel;

placing the first chassis unit on the mandrel such that the coil is surrounded by the first chassis unit; and placing and gluing a vibratory diaphragm on the first chassis unit and on the coil, wherein a first module of the electrodynamic transducer is obtained;

producing an annular second chassis unit by placing a pole piece, a magnet and a yoke in a first portion of a second injection-molding tool, the first portion of the second injection-molding tool having a first annular recess, wherein the pole piece, the magnet and the yoke each have a central hole;

placing a second portion of the second injection-molding tool on the first portion of the first injection-molding tool, the second portion of the second injection-molding tool having a second annular recess, and injection-molding a cavity defined by the first and second recesses in the second injection-molding tool with plastic, wherein after hardening of the injected plastic a second chassis unit is obtained, and wherein the second chassis unit is rotationally symmetrical;

wherein the second chassis unit fills the holes in the pole piece, the magnet and the yoke such that the pole piece, the magnet and the yoke are joined together by the injected second chassis unit, and wherein a second module of the electrodynamic transducer is obtained; and joining the first module and the second module to obtain the electrodynamic transducer, wherein the first chassis unit has connection portions for electrically connecting the coil, the connection portions passing the second chassis unit laterally; and wherein no rotational alignment of the first module or the second module is performed for the joining.

2. The method as set forth in claim 1, wherein a contact strip is put between the first and second portions of the first injection-molding tool before injecting the plastic, and a middle portion of the contact strip is removed after the plastic is injected to obtain said connection portions.

3. The method as set forth in claim 1, wherein the first chassis unit has on its lower side an annular recess that may define a position of the first chassis unit when placing it on the mandrel, so as to center the coil in the first chassis unit, wherein the annular recess has a radius that is smaller than a distance from a center of the first chassis unit to at least one of the connecting portions.

4. The method as set forth in claim 3, wherein the second chassis unit has an upwardly directed circumferential shoulder; and said joining the first module and the second module comprises placing the annular recess of the first chassis unit on the shoulder of the second chassis unit.

5. The method as set forth in claim 1, wherein the second chassis unit has a dome above the pole piece, the dome reducing a cavity below a calotte of the diaphragm after said joining the first module and the second module.

6. An electrodynamic transducer comprising:
a membrane system module; and
a rotationally symmetric magnet system module having an outer radius;
wherein the membrane system module comprises:
    a first annular chassis unit made by injection-molding and a diaphragm that is fixed on the first chassis unit; and
    at least one contact strip that is embedded in the first chassis unit during injection-molding, the at least one contact strip having a connection portion;
    wherein the diaphragm has a coil seat on which a coil is fixed, the coil being electrically connected to the connection portion of the at least one contact strip, and
    wherein the first chassis unit has on its lower side an annular recess;
wherein the rotationally symmetric magnet system module comprises:
    a pole piece, a magnet and a yoke, each having a central hole; and
    a second chassis unit made by injection-molding and filling the central holes in the pole piece, the magnet and the yoke and at least partially surrounding the yoke so that the pole piece, the magnet and the yoke are held by the second chassis unit, wherein the second chassis unit is rotationally symmetric;
    wherein the second chassis unit has an upwardly directed circumferential shoulder outside the yoke; and
    wherein the second chassis unit has a mushroom-shaped dome above the pole piece; and wherein the membrane system module and the magnet system module are put together without rotational alignment and the annular recess of the first chassis unit of the membrane system module is arranged on the circumferential shoulder of the second chassis unit of the magnet system module, so as to define a position of the coil of the membrane system module relative to at least one of the pole piece, the magnet and the yoke of the magnet system module.

7. The electrodynamic transducer as set forth in claim 6, wherein
the diaphragm has a calotte; and
the mushroom-shaped dome has an outer shape adapted to the calotte and is adapted for reducing a cavity below the calotte.

8. An electrodynamic transducer, comprising:
a membrane system module; and
a rotationally symmetric magnet system module;
wherein the membrane system module comprises:
    a first annular chassis unit made by injection-molding and a diaphragm that is fixed on the first chassis unit,
    wherein the diaphragm has a coil seat on which a coil is fixed, and
    wherein the first chassis unit has, on a side opposite the diaphragm, an annular recess;
wherein the rotationally symmetric magnet system module comprises:
    a pole piece, a magnet and a yoke that each have a central hole; and
    a second chassis unit made by injection-molding and filling the central holes in the pole piece, the magnet and the yoke;
    wherein the second chassis unit at least partially surrounds the yoke so that the pole piece, the magnet and the yoke are held by the second chassis unit, and
    wherein a magnetic gap results at least between the yoke and the pole piece;
    wherein the second chassis unit has a circumferential shoulder outside the yoke, and
    wherein the second chassis unit has a mushroom-shaped dome above the pole piece;
wherein the membrane system module and the magnet system module are arranged on each other without rotational alignment such that the annular recess of the first chassis unit matches the circumferential shoulder of the second chassis unit, whereby the coil of the membrane system module takes a defined position within said magnetic gap of the magnet system module.

9. The electrodynamic transducer as set forth in claim 8, wherein
at least one contact strip is embedded in the first chassis unit during injection molding, the at least one contact strip having a connection portion, and
the coil is electrically connected to the connection portion.

10. The electrodynamic transducer as set forth in claim 8, wherein
the diaphragm has a calotte; and
the mushroom-shaped dome is below the calotte and has a shape adapted to the calotte, thereby reducing a cavity between the rotationally symmetric magnet system module and the calotte.

11. The method as set forth in claim 1,
wherein the second chassis unit has a maximum outer radius; and wherein the connection portions of the first chassis unit are at a distance from a center of the first chassis unit that is larger than the maximum outer radius of the second chassis unit.

12. The method as set forth in claim 1,
wherein the diaphragm has a calotte,
wherein the second chassis unit has a mushroom-shaped dome adapted to a shape of the calotte, thereby reducing a cavity below the calotte of the diaphragm after said joining the first module and the second module.

13. The method as set forth in claim 12,
wherein the mushroom-shaped dome has a maximum height at its center.

14. The electrodynamic transducer as set forth in claim 6,
wherein the mushroom-shaped dome of the second chassis unit of the magnet system module has an outer shape adapted to the diaphragm of the membrane system module, thereby reducing a cavity between the magnet system module and the membrane system module.

15. The electrodynamic transducer as set forth in claim 6,
wherein the mushroom-shaped dome has a maximum height at its center.

16. The electrodynamic transducer as set forth in claim 8,
wherein the second chassis unit has a mushroom-shaped dome above the pole piece; and
wherein the mushroom-shaped dome has an outer shape that is adapted to a shape of the diaphragm of the membrane system module.

17. The electrodynamic transducer as set forth in claim 8,
wherein the mushroom-shaped dome has a maximum height at its center.

* * * * *